Aug. 28, 1956  C. BALLHAUSEN  2,761,050
METHOD OF AND A FEED DRIVE FOR THE REGULATION OF
THE SPARK GAP IN METALWORKING MACHINES
Filed Sept. 29, 1953
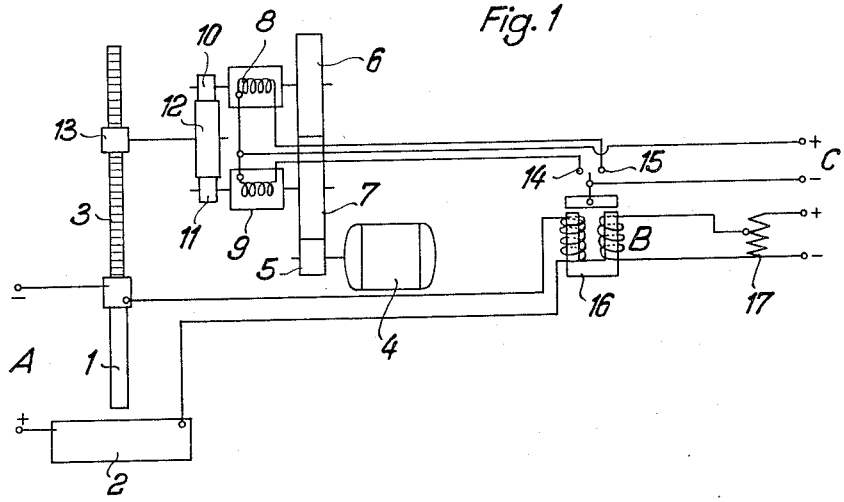
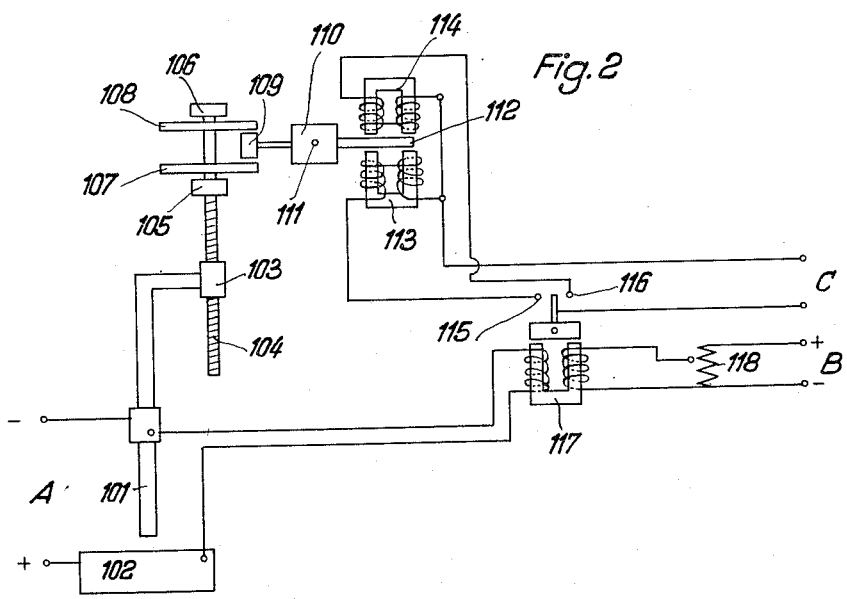
Inventor:
Carl Ballhausen
By Cushman, Darby & Cushman
Attys

United States Patent Office 2,761,050
Patented Aug. 28, 1956

2,761,050

METHOD OF AND A FEED DRIVE FOR THE REGULATION OF THE SPARK GAP IN METAL-WORKING MACHINES

Carl Ballhausen, Krefeld, Germany, assignor to Deutsche Edelstahlwerke Aktiengesellschaft, Krefeld, Germany Application September 29, 1953, Serial No. 383,111

Claims priority, application Germany October 4, 1952

11 Claims. (Cl. 219—15)

The present invention relates to a method of and a feed drive for the regulation of the width (length) of the spark gap in metal-working machines.

The present invention concerns metal-working machines in which the removal of metallic material is effected by the erosive action of an electric spark. The spark is drawn between an electrode and the workpiece, and is generated by an alternating current, in particular of high-frequency, or by condenser discharges. The electrode and the workpiece are generally situated in a cooling medium, preferably in an oil of suitable composition.

The invention concerns in particular the feed drive for the electrode. The distance of the electrode from the metal surface to be worked and consequently the length of the spark gas must be maintained constant as far as possible during the working, that is to say, care must be taken that the jump-over voltage for the spark must be maintained substantially constant.

The problem thus arises of regulating the feed drive for the electrode in dependence upon the spark voltage. This may be effected by means of a motor having a reversible direction of rotation, which co-operates with a current generator, the energisation of which is in turn influenced by the spark gap voltage or by the rectified high-frequency alternating voltage and a comparison voltage. This necessitates considerable expenditure for circuit elements, and it is the object of the invention to provide a substantially simpler arrangement less susceptible to breakdown for this purpose.

According to the invention, it is proposed to employ for the feed drive regulating the length of the spark gap an electric motor constantly rotating in the same direction, which is in engagement with a mechanical reversing gear for the electrode. The reversing gear is provided with electrical clutches and the energising current for these clutches is controlled by a relay, which is connected on the one hand to the spark voltage and on the other hand to an adjustable and substantially constant comparison voltage. In particular, the arrangement according to the invention comprises two gear wheels driven in opposite directions by the electric motor. The shafts of these gear wheels are provided with electric clutches which are influenced by the aforesaid relay and which, according to choice, couple the gear wheels or the gear-wheel shafts with the gear moving the electrode forwards and backwards.

It has been found that it may be advantageous to employ a friction-wheel gearing instead of a reversing gear operating with clutches and gear wheels, and in accordance with the invention it is therefore further proposed to provide a motor provided with a friction wheel and adapted to be pivoted under the influence of the relay. Mounted on the electrode spindle are two wheel discs, the axial distance between which is greater than the diameter of the motor friction wheel situated between them. The motor friction wheel can therefore be made to bear against one disc or the other, according to choice, as a result of the relay-controlled pivoting movement of the motor, or it may be so situated between the discs that no driving engagement is made with either disc.

These arrangements entail only a small expenditure for electric circuit elements, can be operated with a simple motor and require only simple and reliably operating mechanical parts.

Two preferred constructional examples of a feed drive according to the invention are diagrammatically illustrated in Figs. 1 and 2 of the drawings, for operation with direct-current spark discharge.

Reference will first be made to Figure 1.

An electric spark drawn between the electrode 1 and workpiece 2 exerts an erosive and therefore material-removing action. The electrode and the workpiece are connected to the poles of a suitable direct-current generator with the aid of a condenser battery comprising resistances. The electrode in the constructional example selected is moved by a toothed rack 3 through a toothed-wheel gear, under the action of the electric motor 4.

The motor 4 runs at constant speed and always in the same direction. The pinion 5 keyed on the motor shaft is in engagement with the two gear wheels 6 and 7 of equal size, which are in turn in engagement with one another and consequently turn in opposite directions. The shafts of the said gear wheels 6 and 7 may be coupled with the shafts of the pinions 10 and 11 respectively by means of the electric clutches 8 and 9. The pinions 10 and 11 are in engagement with the gear wheel 12, on the shaft of which the gear wheel 13 is keyed, the latter gear wheel moving the toothed rack 3 and consequently the electrode 1.

The clutches 8 and 9 are electrically energised as required and it will be seen that when, for example, the clutch 9 is engaged and the clutch 8 disengaged, the gear wheels 6 and 11 are moved, so that the gear wheel 12 rotates in the corresponding direction and the electrode 1 is thus accordingly moved. On the other hand, if the clutch 8 is engaged and the clutch 9 disengaged, the drive takes place through the wheels 6, 7 and 10, but in this case in such direction as to move the electrode in the opposite direction. If both clutches are disengaged, the electrode 1 does not move, although the motor 4 continues to run constantly.

In order to control the energising current for the two clutches 8 and 9, a relay 16 is provided, which actuates the contacts 14 and 15, which lie in the leads extending from a direct-current source C to the windings of the clutches 8 and 9. The relay 16 is on the one hand at the voltage A, which exists between the electrode 1 and the workpiece 2. The second winding of the relay 16 is connected to a comparison voltage B, which is adjustable by means of the potentiometer 17. The two windings of the relay are of opposite direction, so that the relay is always in the operative or centre position when the voltages A and B are equal.

The arrangement operates as follows:

There is set up at the potentiometer 17 a voltage B which corresponds to the voltage A for a predetermined spark gap length. The relay 16 is consequently in the centre position and neither of the two clutches receives current. The feed drive thus remains inoperative. Owing to the pruning away of the workpiece 2 and of the electrode 1, the spark gap length becomes greater and the spark voltage is consequently increased. Therefore, the voltage A is predominant and the relay closes the contact 14, so that the clutch 9 is engaged. The feed is thereby started and the electrode 1 is fed forward. If the electrode 1 comes into contact with the workpiece as a result of the forward feed, a short-circuit occurs and the voltage A at the relay 16 is 0. Consequently, the relay opens the contact 14 and closes the contact 15, so that the clutch is disengaged and the clutch 8 engaged, whereby the electrode is returned until the voltages A and B again reach equal values and the relay is returned to the zero position. Generally, the regulation will so take place that before a short-circuit occurs between the electrode and the workpiece the zero position of the relay is established with voltage equality between A and B, that is to say, the electrode becomes stationary before a short-circuit occurs and the spark gap length corresponds to the required dimension.

It will readily be seen that the simple mechanical arrangement according to the constructional example may be modified in some respects for the purpose of adaptation to particular requirements. Thus, it is possible, for example, to provide the gear wheels 6 and 7 with unequal numbers of teeth, so that the electrode 1 moves backwards more rapidly. This effect can also be obtained by modifying the electric circuit arrangement. In addition, it is possible to dispose between the gear wheels 12 and 13 a variable gearing by means of which the forward feed of the electrode can be approximately adjusted.

When high-frequency alternating current is employed, it is merely necessary to provide a rectifier between the relay coil and the tap point for the spark voltage. The clutches employed may be multi-disc clutches known per se. However, the known magnet coil clutches have proved particularly suitable.

A constructional form comprising a friction gearing is diagrammatically illustrated in Figure 2.

The electrode 101 and the workpiece 102 are connected to the current source A. A spark is drawn between the electrode and the workpiece and exerts the erosive and consequently material-removing action. The electrode is secured by an arm to a nut 103, which surrounds a spindle 104 having a fine-pitched thread. A rectilinear guide for the electrode is also provided, this guide having been omitted from the diagrammatic illustration for the sake of clarity. Depending upon whether the spindle is turned to the right or to the left, the electrode is raised or lowered through the nut.

The spindle 104 is rotatably mounted at 105 and 106, while two friction discs 107 and 108 are mounted thereon. The axial distance between the two discs 107 and 108 is made greater by a predetermined amount than the diameter of the friction wheel 109 situated between the two friction wheels.

The friction wheel 109 is mounted on the shaft of the motor 110, which is adapted to turn about the pivot 111. It will be seen that by the pivoting movement about the pivot 111 the motor friction wheel 109 can be made to bear against either one of the friction wheel 107 and 108 according to choice. The motor constantly rotating in the same direction can therefore impart different directions of rotation to the spindle by reason of its pivotability, whereby the electrode is either raised or lowered. When the friction wheel 109 is in the centre position, the electrode remains stationary.

In order to pivot the motor 110, the latter is provided on the side opposite the friction disc 109 with an armature 112 situated in the effective range of the electromagnets 113 and 114. Depending upon which of the magnets is energised, the armature is drawn upwards or downwards and thus exerts the pivoting action on the motor 110. The energisation is effected from any desired source of current C, to which the magnets 113 and 114 are connected according to choice by the relay 117 through the contacts 115 and 116. One of the two coils of the relay 117 is connected to the spark gap between the electrode 101 and the workpiece 102. The other coil is connected to a separate voltage B, the value of which can be adjusted by means of the potentiometer 118. The two windings of the relay are of opposite direction, so that the relay is in the inoperative or centre position when the voltages A and B are equal. The operation of the relay is the same as more particularly described with reference to Figure 1. By the actuation of either one of the contacts 115 and 116 or by setting the relay to the centre position, according to choice, the pivoting of the motor 110 and consequently the turning to the left or right, or the stopping of the electrode spindle is brought about.

The motor 110 runs constantly and in the same direction, the required speed being determined by a step-down gearing. In order that the speed may be adapted to the eroding process, it may be expedient so to arrange the motor and consequently the friction wheel 109 that they may be displaced in the axial direction, so that the friction wheel 109 may act on different radii of the discs 106 and 108. It is expedient in this case also to arrange the magnets 113 and 114 displaceably.

It is actually immaterial whether the lower disc or the upper disc effects the retraction of the electrode, but it has been found that it is advantageous to effect the retracting movement by means of the upper disc 108, because the pressing of the friction wheel 109 against the disc 108 is sufficient to lift the spindle and consequently also the electrode 101 axially owing to the small freedom of movement of the spindle in the bearings 105 and 106. Short-circuits which may be due to metal particles at the working point between the electrode 101 and the workpiece 102 are thus obviated by the lifting of the friction wheel 109 by a short distance, without any rotation of the spindle, and thus a pronounced upward movement of the electrode 101, being necessary.

It is thus possible to provide a mechanically simple arrangement which is not susceptible to breakdown with a circuit arrangement equally as simple as the first-mentioned constructional form, without the use of gear wheels and electric clutches.

What I claim is:

1. The method of regulating the narrow spark gap between an electrode and a metal workpiece in metal working apparatus wherein metal workpieces can be worked with removal or corrosion of material by sparking between an electrode and the workpiece, which comprises operating a unidirectionally rotating electric motor in driving relation with a mechanical reversing drive for the electrode and controlling the said reversing drive by a relay which on the one hand is connected across the spark gap and on the other hand to a source of constant comparison voltage whereby the said drive is rendered inoperative when said spark and comparison voltages are equal but feeds the electrode to narrow or open the gap when one or other of said voltages predominates.

2. Method as in claim 1, in which the reversing drive is provided with electrically operated clutches the energising current for which is controlled by said relay.

3. Method as in claim 1, in which the reversing drive is of edge to face friction gear kind with its driver connected to the shaft of an electric motor and, for swinging the driver either side of neutral position for forward or reverse feed of the electrode, electrically operated means are provided, the energising current for which is controlled by said relay.

4. The method of regulating the narrow spark gap between an electrode and a metal workpiece in metal working apparatus, wherein the spark gap is submerged in a dielectric liquid cooling medium and the metal workpiece is worked by removal or corrosion of the material thereof by sparking between the electrode and the workpiece, which comprises operating a uni-directionally rotating electric motor in driving relation with an electrically controlled mechanical reversing drive for displacing the electrode towards or away from the workpiece and controlling the said reversing drive by a relay comprising a winding connected across the spark gap and a further winding connected to a source for maintaining a constant voltage between the ends thereof, and causing the windings to operate an element of the relay so that the drive is controlled to be inoperative when the voltage across the spark gap and that between the ends of the further winding are equal and to feed the electrode to narrow or open the said spark gap when one or other of the said voltages predominates.

5. Feed drive for regulating the spark gap between the electrode and workpiece in metal working machines wherein metal workpieces can be worked with removal or corrosion of material by sparking between an electrode and the workpiece, comprising a uni-directionally rotating electric motor, a mechanical reversing drive for the electrode in driving relation with said motor and a relay controlling the reversing drive and comprising a coil connected across the spark gap and a further coil connected to a source of current supply so that a predetermined voltage may be maintained between the ends thereof, the relay including an element operated according to the respective voltages so that the drive is inoperative when the said voltages are equal but feeds the electrode to narrow or open the said spark gap when one or other of the said voltages predominates.

6. Feed drive for regulating the spark gap between the electrode and workpiece in metal working machines wherein metal workpieces can be worked with removal or corrosion of material by sparking between an electrode and the workpiece, comprising a uni-directionally rotating electric motor, a mechanical reversing drive for the electrode in driving relation with said motor and a relay controlling the reversing drive and connected across the spark gap on the one hand and to a source of constant comparison voltage on the other hand, said drive comprising oppositely rotatable electrode-displacing elements which are inoperative when the said voltages are equal but which are selectively operable in response to the said relay, the one to cause the movement of the electrode to narrow the spark gap when one of the said voltages predominates and the other the movement of the electrode to open the spark gap when the other of the said voltages predominates.

7. Feed drive according to claim 6, said reversing drive comprising gear wheels adapted to be driven in opposite directions by the said electric motor and electric clutches influenced by the relay for coupling the gear-wheel shafts according to choice with the gears moving the electrode forwards and backwards.

8. Feed drive according to claim 7, in which said gear wheels have an equal number of teeth.

9. Feed drive according to claim 6, comprising gear wheels driven in opposite directions by the said electric motor and having unequal numbers of teeth, so that a rapid return movement of the electrode is produced.

10. Feed arrangement according to claim 6, said motor being provided with a friction wheel and being adapted to be pivoted under the influence of the relay, and two friction discs mounted on the electrode spindle, the axial distance between the said friction discs being greater than the diameter of the motor friction wheel arranged between them.

11. Feed arrangement according to claim 10 in which the upper wheel disc serves for the retracting movement of the spindle.

References Cited in the file of this patent

UNITED STATES PATENTS 2,402,922   Sheldon _____ June 25, 1946